(12) United States Patent
Baykal et al.

(10) Patent No.: US 8,495,371 B2
(45) Date of Patent: Jul. 23, 2013

(54) NETWORK DEVICE AUTHENTICATION

(75) Inventors: Berkay Baykal, Westborough, MA (US); Shaun Noel Missett, Avon, CT (US)

(73) Assignee: Calix, Inc., Petaluma, CA (US)

( * ) Notice: Subject to any disclaimer, the term of this patent is extended or adjusted under 35 U.S.C. 154(b) by 391 days.

(21) Appl. No.: 12/652,949

(22) Filed: Jan. 6, 2010

(65) Prior Publication Data
US 2011/0167268 A1    Jul. 7, 2011

(51) Int. Cl.
*H04L 9/00* (2006.01)
(52) U.S. Cl.
USPC ........... 713/169; 713/150; 713/155; 713/168; 726/2; 726/3; 726/5; 726/6; 726/7; 726/9; 726/17; 340/5.8; 455/561
(58) Field of Classification Search
USPC .................. 713/169, 150, 155, 168; 726/2, 3, 726/5, 6, 7, 9, 17; 455/561; 340/5.8
See application file for complete search history.

(56) References Cited

U.S. PATENT DOCUMENTS

| 7,496,752 | B2 | 2/2009 | Yamaguchi et al. | |
| 2004/0054962 | A1* | 3/2004 | Shima et al. | 715/500 |
| 2005/0132189 | A1* | 6/2005 | Katsube et al. | 713/168 |
| 2006/0034462 | A1 | 2/2006 | Lee | |
| 2006/0129814 | A1 | 6/2006 | Eun et al. | |
| 2006/0212928 | A1 | 9/2006 | Maino et al. | |
| 2007/0226779 | A1* | 9/2007 | Yokomitsu et al. | 726/2 |
| 2008/0098464 | A1* | 4/2008 | Mizrah | 726/5 |
| 2008/0172730 | A1* | 7/2008 | Sandhu et al. | 726/9 |
| 2009/0063851 | A1* | 3/2009 | Nijdam | 713/155 |
| 2010/0024029 | A1* | 1/2010 | Sasaki et al. | 726/17 |
| 2010/0106960 | A1* | 4/2010 | Kudo et al. | 713/150 |
| 2010/0131761 | A1* | 5/2010 | Kim et al. | 713/169 |
| 2011/0055561 | A1* | 3/2011 | Lai et al. | 713/168 |
| 2011/0068894 | A1* | 3/2011 | Braun | 340/5.8 |
| 2011/0145900 | A1* | 6/2011 | Chern | 726/7 |
| 2011/0294496 | A1* | 12/2011 | Hirakawa et al. | 455/422.1 |

OTHER PUBLICATIONS

IEEE Standard for Local and metropolitan area networks, Port-Based Network Access Control, IEE Std. 802.1X-2004, Dec. 13, 2004, 179 pages.
Patent application entitled, "Network Device Authentication," U.S. Appl. No. 12/652,957, filed Jan. 6, 2010.
Office Action for U.S. Appl. No. 12/652,957, dated Mar. 14, 2012, 15 pages.
Response to office action for U.S. Appl. No. 12/652,957, filed Jun. 14, 2012, 18 pages.

* cited by examiner

*Primary Examiner* — Beemnet Dada
*Assistant Examiner* — Sayed Beheshti Shirazi
(74) *Attorney, Agent, or Firm* — Shumaker & Sieffert, P.A.

(57) ABSTRACT

In general, this disclosure relates to maintaining security between an optical network terminal (ONT) and an optical network aggregation device in an Active Ethernet network. An optical network aggregation device includes one or more optical Ethernet switches that can be adaptively configured to support authentication of one or more ONTs. For example, the optical network aggregation device may include a controller with an authentication unit for managing ONT authentication and an optical Ethernet interface for transmitting and receiving data over the optical network. The authentication unit may exchange authentication request messages via the optical Ethernet interface with an ONT and grant the ONT access to the provider network based on the exchange, thereby preventing rogue devices from gaining access to the provider network.

33 Claims, 8 Drawing Sheets

NETWORK DEVICE AUTHENTICATION

TECHNICAL FIELD

The disclosure relates to computer networking and, more particularly, to device authentication.

BACKGROUND

Optical networking systems that communicate information over optical fiber links are common place. An example of an optical transport system is an Active Ethernet (AE) network. An AE network can deliver voice, video, and data among multiple network nodes, often referred to as optical network terminals (ONTs), using a common optical fiber link. Each ONT terminates the optical fiber link for a residential or business subscriber, and is sometimes referred to as a subscriber premises node. Each ONT is connected to one or more client devices, which ultimately receive the voice, video, and data delivered via the optical network from a service provider network. Generally, an AE network includes an optical Ethernet switch, having multiple, independent optical network interface modules that serve multiple optical fiber links and that is located remotely from the ONT. An optical network interface module provides for transmission and reception of data packets over a particular optical fiber link that serves an ONT.

The AE network and the ONT operate based on IEEE 802.3 defined media access control (MAC) and physical layers. The utilization of standard Ethernet MAC and physical layers may enable the AE network to use off-the-shelf Ethernet devices. These Ethernet devices are loosely coupled, meaning that the ONT and the optical Ethernet switch may not generally require any knowledge about each other in order to transmit data between the two devices. As such, it may be possible to terminate the optical fiber link on a device different than the one provided by the provider network operator, which may permit undesirable devices to operate on the service provider network. The IEEE 802.1X authentication standard may be used to prevent unauthorized access. However, this standard generally requires establishing and maintaining an authentication server, such as a Remote Authentication Dial In User Service (RADIUS) database, that maintains credentials such as a username/password combination or digital certificate that is unique to each subscriber or device. Consequently, 802.1X authentication tends to be a solution that requires maintenance of additional infrastructure in a central office as well as administrative overhead to continually update and maintain the credentials stored on the authentication server.

SUMMARY

In general, this disclosure relates to techniques for maintaining security between an ONT and an optical network aggregation device in an AE network. An optical network aggregation device may include one or more optical Ethernet switches that can be adaptively configured to support authentication of one or more ONTs. For example, the optical network aggregation device may include a controller with an authentication unit for managing ONT authentication and an optical Ethernet interface for transmitting and receiving data over the optical network. The authentication unit may exchange authentication request messages via the optical Ethernet interface with an ONT and grant the ONT access to the provider network based on the exchange, thereby preventing unauthorized access to the provider network.

In one example, a method includes generating, via a first optical network device, a first authentication message comprising a first authentication code and transmitting, via the first optical network device, the first authentication message to a second optical network device. The method also comprises receiving, via the first optical network device, a second authentication message comprising a second authentication code generated via the second optical network device, and authorizing, via the first optical network device, communication between the first optical network device and the second optical network device, based on the second authentication message.

In another example, an optical network device comprises a processor that is configured to generate a first authentication message comprising a first authentication code and transmit the first authentication message to a second optical network device. The processor is further configured to receive a second authentication message comprising a second authentication code generated via the second optical network device, and authorize communication between the optical network device and the second optical network device, based on the second authentication message In another example, an optical network device comprises means for generating a first authentication message comprising a first authentication code, and means for transmitting the first authentication message to a second optical network device. The optical network device also comprises means for receiving a second authentication message comprising a second authentication code generated via the second optical network device, and means for authorizing communication between the optical network device and the second optical network device, based on the second authentication message.

In another example, a system comprises an optical network termination device, and an optical network aggregation device. The optical network aggregation device comprises a processor configured to generate a first authentication message comprising a first authentication code, transmit the first authentication message to the optical network termination device, receive a second authentication message comprising a second authentication code generated via the optical network termination device, and authorize communication between the optical network aggregation device and the optical network termination device, based on the second authentication message.

In another example, a computer-readable storage medium comprising instructions that, upon execution, cause one or more processors to generate, via a first optical network device, a first authentication message comprising a first authentication code and transmit, via the first optical network device, the first authentication message to a second optical network device. The instructions also cause the one or more processors to receive, via the first optical network device, a second authentication message comprising a second authentication code generated via the second optical network device, and authorize, via the first optical network device, communication between the first optical network device and the second optical network device, based on the second authentication message.

In other examples, a method includes generating, via a first optical network device, a notification message, and transmitting, via the first optical network device, the notification message to a second optical network device. The method also includes receiving, via the first optical network device, a first authentication message comprising first message data and a first authentication code generated via the second optical network device based on the first message data and a first key and generating, via the first optical network device, a second authentication message comprising second message data and a second authentication code generated based on the second message data and a second key, and transmitting, via the first optical network device, the second authentication message to the second optical network device. Finally, the method includes receiving, via the first optical network device, an authentication complete message from the second optical network device.

In another example, an optical network device comprises a processor configured to generate a notification message, transmit the notification message to a second optical network device, and receive a first authentication message comprising first message data and a first authentication code generated via the second optical network device based on the first message data and a first key. The processor of the network device is further configured to generate a second authentication message comprising second message data and a second authentication code generated based on the second message data and a second key, transmit the second authentication message to the second optical network device, and receive an authentication complete message from the second optical network device.

In another example, the disclosure provides an optical network device comprising means for generating a notification message, means for transmitting the notification message to a second optical network device, and means for receiving a first authentication message comprising first message data and a first authentication code generated via the second optical network device based on the first message data and a first key. The optical network device further comprises means for generating a second authentication message comprising second message data and a second authentication code generated based on the second message data and a second key, means for transmitting the second authentication message to the second optical network device, and means for receiving an authentication complete message from the second optical network device.

In another example, a system comprises an optical network aggregation device, and an optical network termination device, wherein the optical network termination device comprises a processor configured to generate a notification message, transmit the notification message to the optical network aggregation device, and receive a first authentication message comprising first message data and a first authentication code generated via the optical network aggregation device based on the first message data and a first key. The processor of the optical network termination device is further configured to generate a second authentication message comprising second message data and a second authentication code generated based on the second message data and a second key, transmit the second authentication message to the optical network aggregation device, and receive an authentication complete message from the optical network aggregation device.

In another example, a computer-readable storage medium comprises instructions that, upon execution, cause one or more processors to generate, via a first optical network device, a notification message, transmit, via the first optical network device, the notification message to a second optical network device, and receive, via the first optical network device, a first authentication message comprising first message data and a first authentication code generated via the second optical network device based on the first message data and a first key. The computer readable storage medium further comprises instructions that, upon execution, cause one or more processors to generate, via the first optical network device, a second authentication message comprising second message data and a second authentication code generated based on the second message data and a second key, transmit, via the first optical network device, the second authentication message to the second optical network device, and receive, via the first optical network device, an authentication complete message from the second optical network device.

The details of one or more examples of the invention are set forth in the accompanying drawings and the description below. Other features, objects, and advantages of the invention will be apparent from the description and drawings, and from the claims.

DETAILED DESCRIPTION

Figure 1:
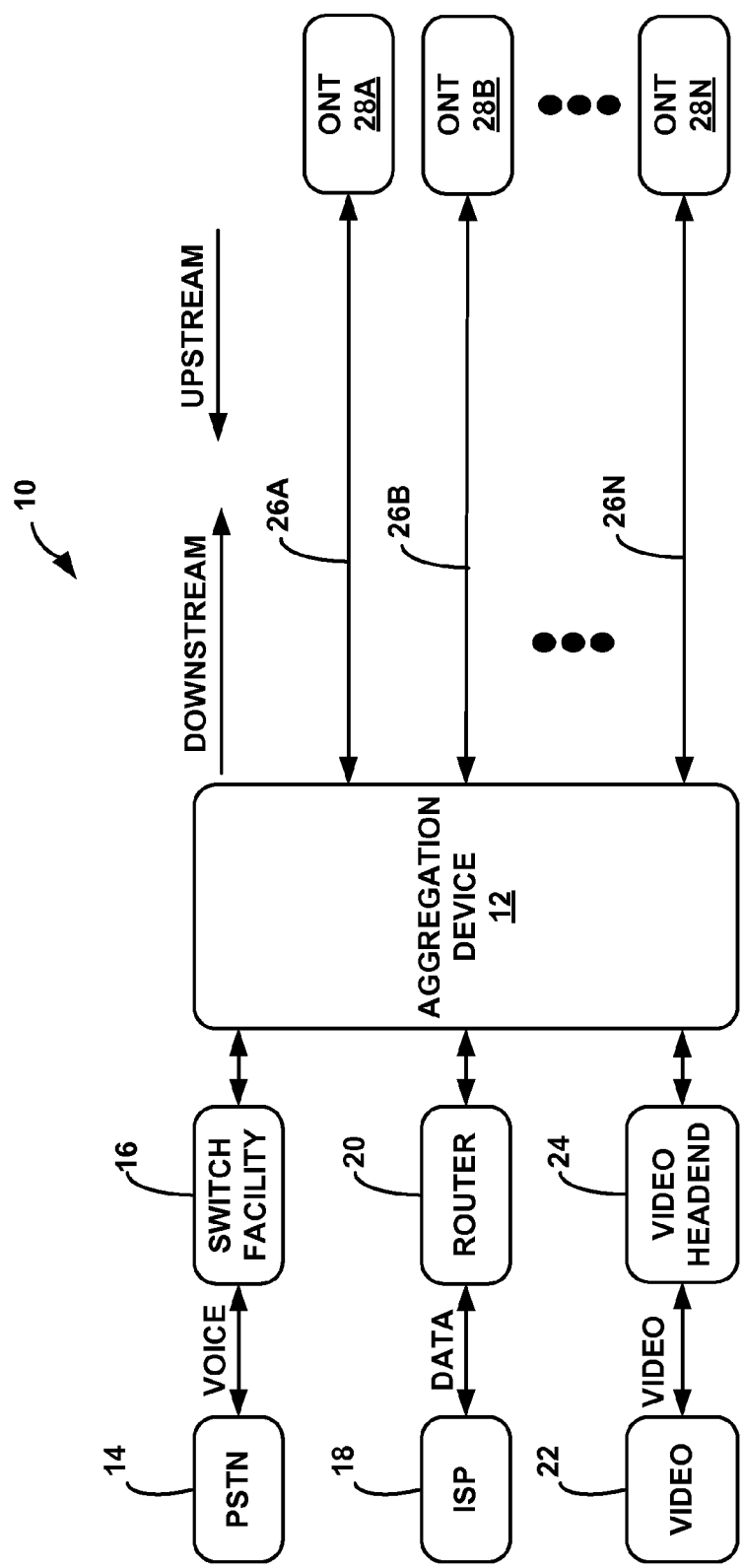
FIG. 1 is a block diagram illustrating one example optical networking system that may implement the techniques described in this disclosure.

In general, this disclosure describes network security techniques for authenticating subscriber premises equipment, such as an ONT, with another optical network device, such as an aggregation device, within an Active Ethernet (AE) network. Failing to authenticate a device may cause undesirable results such as permitting an unapproved device to operate on the provider network. By authenticating an ONT prior to permitting the ONT to transmit data to the provider network, users may be prevented from gain unauthorized access to the provider network. Using the techniques described in this disclosure, ONTs authorized by a network operator may be detected and permitted full access to the provider network while access by unauthorized devices may be blocked.

The authentication techniques described in this disclosure enable an ONT to be authenticated by an aggregation device based on a key that may be shared between the ONT and the aggregation device. In general, the aggregation device sends an authentication message with a first code to the ONT, the ONT processes the authentication message and sends a reply message with a second code to the aggregation device. The aggregation device examines the contents of the reply message, in particular the second code. If the second code matches what the aggregation device expected to receive back from the ONT, the aggregation device authorizes the ONT, unblocks at least one of its ports for use by the ONT, and sends an authentication complete message to the ONT indicating that the port on the aggregation device may be used by the ONT.

The ONT may be an outdoor, just in-door, or a desktop model terminating a direct fiber connection from the provider network. The ONT may include a memory that stores a key pre-programmed into the ONT at the factory. In some examples, the pre-programmed key may be based on the type, model number, manufacturer, or other identifier that is common between several different ONTs. By pre-programming a key based on a characteristic shared across more than one ONT, such as a model number, device type, or manufacturer, the aggregation device may not need to maintain a memory that stores authentication information specific to each ONT.

The aggregation device may include environmentally hardened Ethernet switches or standard carrier grade Ethernet switches, for example, and may be deployed in remote terminals or central offices. The aggregation device may include a memory, an administration interface, and a controller. The administration interface may permit an operator to update keys stored in the memory of the aggregation device as new models, manufacturers, or types of ONTs are implemented at the customer premises, for example. The controller may generate the authentication message, process the response from the ONT, and then generate the authorization complete message, if the ONT is authenticated.

By performing authentication of an ONT using the techniques described in this disclosure, the service provider does not need to invest in additional infrastructure nor update and maintain a database of unique credentials for each subscriber, e.g., as with a RADIUS server. Techniques described in this disclosure are not limited to application by optical networking devices and may be applicable to any networking device which supports standard Ethernet features.

FIG. 1 is a block diagram illustrating one example optical transport system 10 that may implement the techniques described in this disclosure. As shown in FIG. 1, optical transport system 10 can be arranged to deliver voice, data, and video content (generally "information") to a number of network nodes via optical fiber links. As one example, optical transport system 10 may be an Active Ethernet (AE) network. A first optical network device, e.g., aggregation device 12, transmits information to and receives information from one or more second optical network devices, i.e. ONTs 28A-28N ("ONTs 28"), via respective fiber links 26A-26N ("fiber links 26"). Fiber links 26 collectively may be considered a fiber bundle. ONTs 28 and aggregation device 12 may be referred to as network interface units. Aggregation device 12, comprising one or more optical Ethernet switches, switches downstream packets to appropriate ONTs 28 via fiber links 26, and receive upstream packets from the ONTs via the fiber links.

As shown in FIG. 1, aggregation device 12 transmits information to and receives information from ONTs 28 via fiber links 26. However, in some examples, aggregation device 12 transmits information to and receives information from other types of subscriber premises nodes used for terminating other types of links that connect the subscriber premises node and aggregation device 12. For example, fiber links 26 may be replaced by any other type of network link that support the transmission of information between aggregation device 12 and the subscriber premises node, such as copper links. Additionally, aggregation device 12 may include one or more non-optical Ethernet switches, and the subscriber premises node may be an Ethernet router that performs the authentication techniques described in this disclosure. Although the techniques described in this disclosure may be useful in various types of Ethernet networks, the disclosure generally refers to implementations in an AE network for purposes of illustration.

An ONT, e.g., ONT 28A, may be located at any of a variety of locations, including residential or business sites. In addition, in some examples, a single ONT, e.g., ONT 28A, may operate on a shared basis to deliver information to two or more closely located residences or businesses via copper or additional optical fiber connections, either directly or via a network hub, router or switch. Each one of ONTs 28 may also include hardware for transmitting information over optical transport system 10. For example, ONT 28A may transmit and receive voice information over the public switched telephone network (PTSN) 14 via aggregation device 12 and switch facility 16 in the course of a telephone conversation. Also, each one of ONTs 28 may transmit and receive data to and from a variety of nodes on the Internet via Internet service provider (ISP) 18, router 20, and aggregation device 12.

Aggregation device 12 may transmit and receive voice information, for example, via the PTSN 14 and a switch facility 16. In addition, aggregation device 12 may be coupled to one or more ISPs 18 via the Internet (not shown) and a router 20. As further shown in FIG. 1, aggregation device 12 may receive video content 22 from video content suppliers (not shown) via a streaming video headend 24. In each case, aggregation device 12 receives the information, and distributes it to one or more ONTs 28. The techniques described in this disclosure are directed to performing authentication between network interface units and more than one aggregation device 12 in optical transport system 10. For simplicity, FIG. 1 depicts optical transport system 10 as having only a single aggregation device 12. It is understood that additional aggregation devices 12 may also be incorporated into optical transport system 10, either working in conjunction with or entirely replacing aggregation device 12.

As described in more detail below, in accordance with the techniques of this disclosure, aggregation device 12 sends an authentication message with a first code to an ONT, e.g., ONT 28A, in order to authenticate the ONT before allowing the ONT to freely communicate with the provider network. The ONT, e.g., ONT 28A, processes the authentication message and transmits a reply message with a second code to aggregation device 12. Upon receiving the reply message from the ONT, aggregation device 12 examines the contents of the reply message and, in particular, the second code. If the second code matches what aggregation device 12 expected to receive back from the ONT, aggregation device 12 authorizes ONT 28A, unblocks at least one of its ports for use by ONT 28A, and sends an authentication complete message to ONT 28A indicating that the port on the aggregation device may be used.

Figure 2:
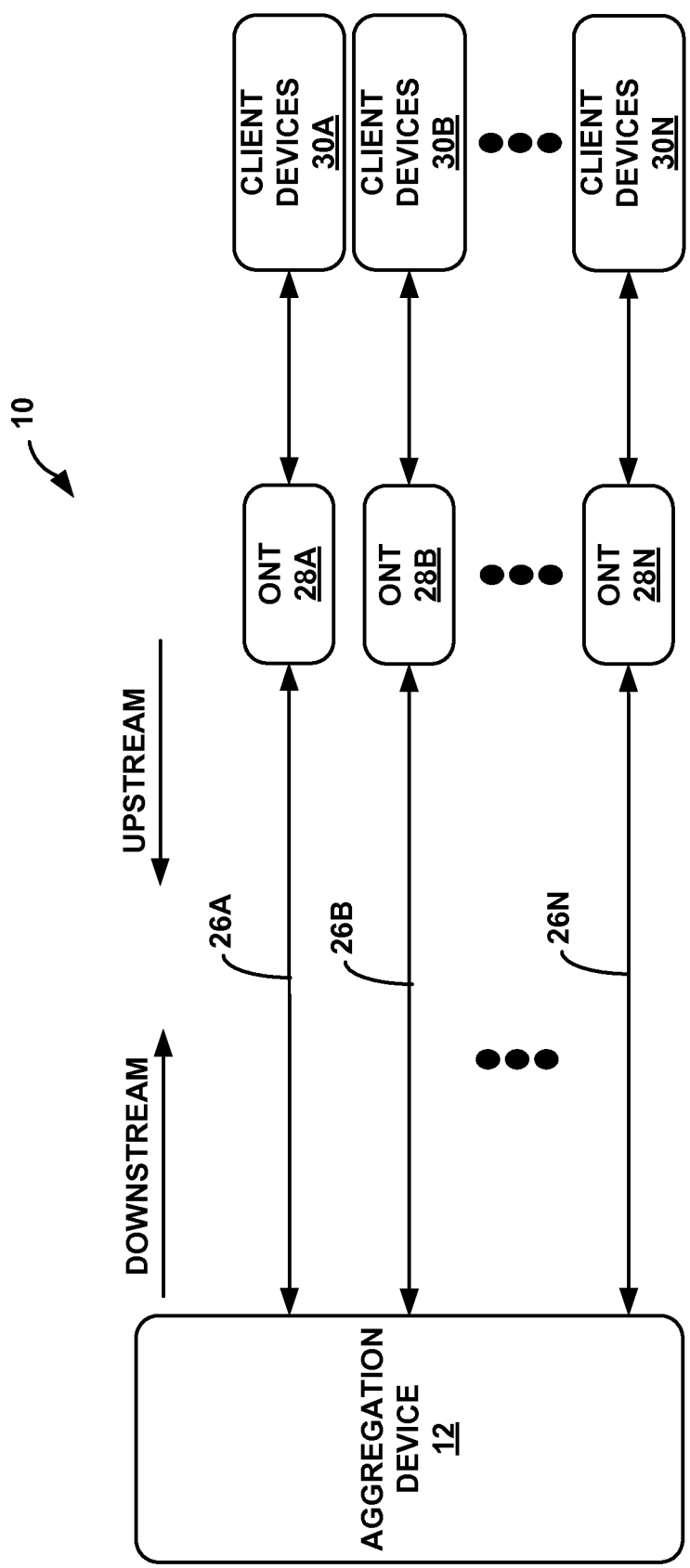
FIG. 2 is a block diagram further illustrating the optical networking system of FIG. 1.

FIG. 2 is a block diagram further illustrating optical transport system 10 depicted in FIG. 1. As shown in FIG. 2, optical transport system 10 can be arranged to include a plurality of client devices 30A-30N ("client devices 30"), each one of client devices 30 being coupled to a respective one of ONTs 28. Each one of ONTs 28, e.g., ONT 28A, includes hardware for receiving information over optical transport system 10 via optical fiber links 26, and delivering the information to the client device to which the particular ONT is coupled, e.g., client device 30A. For example, each one of ONTs 28 may serve as an access point for one or more computers, network appliances, televisions, set-top boxes, wireless devices, or the like, which form the client devices 30, for video and data services. In addition, each one of ONTs 28 may be connected to subscriber telephones for delivery of telephone services.

Hence, ONTs 28 may support transmission of digital video packets to support television applications, digital data packets to support Internet access, and digital voice packets to support telephone services. In some cases, video services may be supported by transmission of radio frequency (RF) video. The information supporting the voice, video, and data services may be transmitted in the same optical bans or different optical frequency bands. Aggregation device 12 may be located in close proximity to or at a location distant from ONTs 28. In some existing networks, aggregation device 12 may reside in a central office (CO) situated within approximately twelve miles from each one of ONTs 28.

Figure 3:
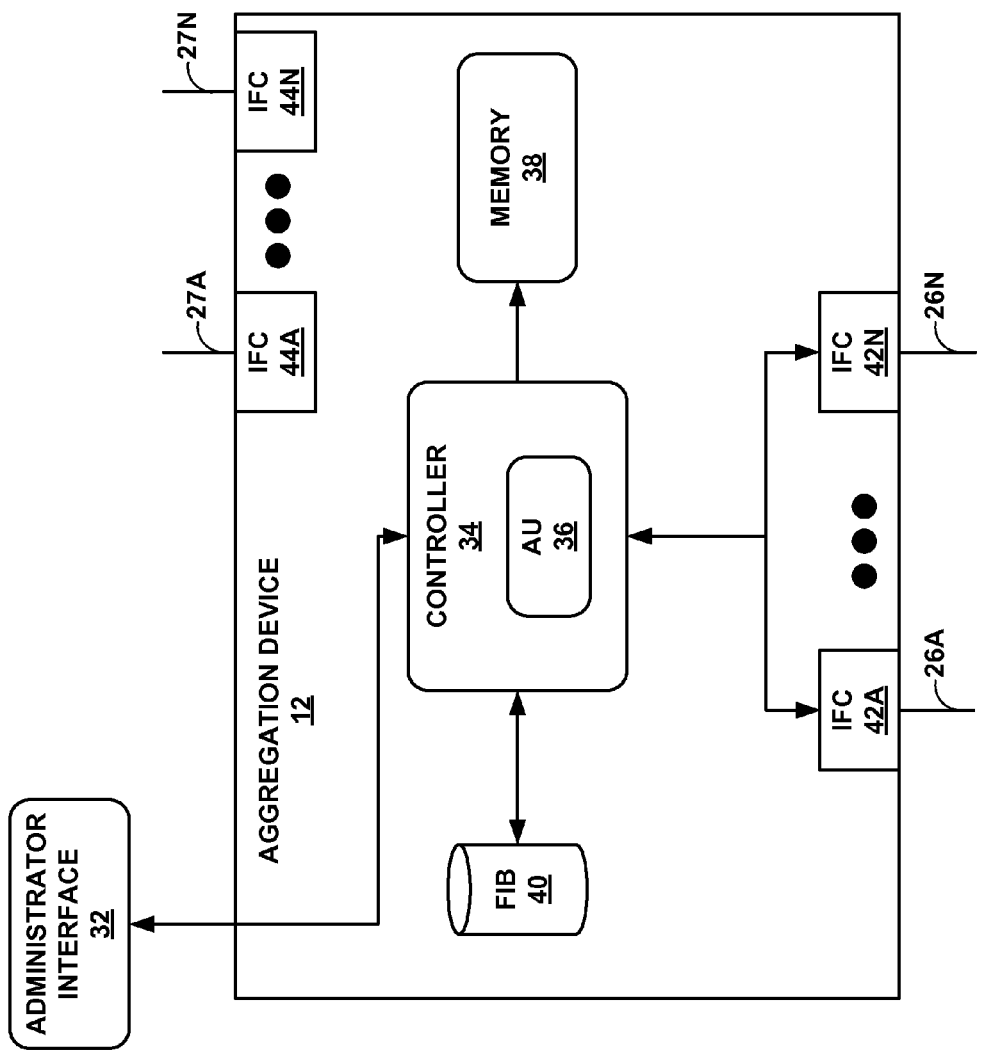
FIG. 3 is a block diagram illustrating an example aggregation device that may implement the techniques described in this disclosure.

FIG. 3 is a block diagram illustrating an example aggregation device 12 that may implement the techniques described in this disclosure. In FIG. 3, aggregation device 12 comprises a single optical Ethernet switch. As shown in FIG. 3, aggregation device 12 includes administrator interface 32, controller 34, authentication unit ("AU") 36, memory 38, forwarding information base (FIB) 40, and one or more interfaces ("IFCs") 42A-42N ("IFCs 42").

Each one of IFCs 42 may comprise ports of one or more interface cards (not shown in FIG. 3). Each one of IFCs 42 couple aggregation device 12 to a respective subscriber premises device, such as one of ONTs 28, via respective fiber links 26. For example, aggregation device 12 is coupled to ONT 28A through IFC 42A via fiber link 26A. Aggregation device 12 may include additional interfaces, IFCs 44A-44N, that couple aggregation device to one or more provider network devices such as switch facility 16, router 20, and video headend 24 via links 27A-27N. In one example, subscriber premises devices and provider network devices may be connected to aggregation device 12 via optical fiber links. In other examples, IFCs 42 may be connected to subscriber premises devices and provider network devices by other types of network links, including copper. Each one of IFCs 42 is coupled to only one network link. For example, IFC 42A is coupled to only a single network link, namely fiber link 26A. The network link may be coupled to one or more client devices or provider network devices.

Each one of IFCs 42 may be configurable by an administrator, by way of a configuration option. The configuration option may be configured or programmed via administrator interface 32. The configuration option is referred to throughout this disclosure as an "authorization option" and may be set, for example, to one of two states: "pre-authorized" or "authorize." For example, if an administrator sets the authorization option of IFC 42A to "pre-authorized," IFC 42A is initialized in a port-unblocked mode (i.e., one or more ports of IFC 42A are unblocked), and does not need to authorize the particular ONT to which IFC 42A is coupled, namely ONT 28A, before allowing ONT 28A to communicate with the service provider network. If, however, an administrator sets the authorization option of IFC 42A to "authorize," IFC 42A is initialized in port-blocked mode (i.e., one or more ports of IFC 42A are blocked) with respect to the ports of IFC 42A associated with ONT 28A. In port-blocked mode, aggregation device 12 may require that ONT 28A, for example, be properly authenticated before unblocking the ports of IFC 42A that are associated with ONT 28A. It should be noted that authenticating ONT 28A may not result in the authorization option for IFC 42A changing from "authorize" to "pre-authorize." Rather, the authorization option may be set independently of the authentication process.

Administrator interface 32 may be a command line or graphical user interface displayed on a display device, such as a computer monitor, that facilitates an operator maintaining aggregation device 12. For example, an operator may use administrator interface 32 to enter various configuration parameters and store those configuration parameters in memory 38. The configuration parameter may include, for example, new keys that correspond to newly deployed ONTs 28 manufactured by a different company, or having a different model number, or of a different type from ONTs 28 that have already been deployed in optical transport system 10. As another example, if a key is discovered by malicious users, ONTs 28 may receive a firmware update with a new key. An operator may then update the corresponding key stored in memory 38 to match the new key programmed into ONTs 28. If a particular manufacturer, model, or type of ONTs 28 is replaced and thus no longer deployed, or if a key is discovered by malicious users, as described above, an operator may use administration interface 32 to remove the old key or keys from memory 38. As another example, the configuration parameters may include information specifying configuration options for IFCs 42, such as whether each one of IFCs 42 is set to "pre-authorized" (ports are unblocked and no authorization is required) or "authorize" (ports start blocked and are only unblocked after successful authorization of the ONT connected to the particular IFC).

Controller 34 manages the flow of information from IFCs 42, accepts and implements configuration changes, e.g., changes to authorization options, or other changes received via administrator interface 32, manages information storage and retrieval from memory 38, and communicates with AU 36 to facilitate the authentication techniques described in this disclosure. In one example, AU 36 is integral with controller 34. In another example, AU 36 is coupled to controller 34 and may have a memory that is separate from memory 38. In general, AU 36 verifies that ONTs 28 are authorized to communicate and performs various steps of the authentication process, including generating authentication messages, verifying authentication responses received from ONTs 28, and generating authorization complete messages.

When information, such as a data packet, is received by aggregation device 12 via IFCs 42, controller 34 and AU 36 examine and process the data packet. For example, if the data packet originated from ONT 28A, AU 36 retrieves from memory 38 authentication information associated with IFC 42A and ONT 28A from memory 38. AU 36 examines the authentication information retrieved from memory 38. If AU 36 determines that ONT 28A has previously been authenticated, or that IFC 42A does not require authentication, e.g., the authorization option was set to "pre-authorized," controller 34 retrieves forwarding information from FIB 40 and processes the data packet accordingly. If AU 36 determines that ONT 28A is not authenticated, controller 34 will not forward the data packet to any other network device, thereby blocking network access to ONT 28A.

When aggregation device 12 and, in particular AU 36, determines that ONT 28A is not authenticated and hence does not forward the data packet, aggregation device 12 is operating in port-blocked mode with respect to ONT 28A. In one example, when operating in port-blocked mode, aggregation device 12 may only process data packets associated with the protocol used to perform the authentication techniques described in this disclosure, and may limit the rate that the authentication protocol data packets are processed by aggregation device 12 in order to prevent the authentication protocol itself from being used in a denial of service attack.

Memory 38 may be a computer-readable storage medium comprising data representing different keys and instructions that cause one or more processors, e.g., controller 34, to perform various functions. Memory 38 may be integral with or coupled to controller 34. Examples of memory 38 include flash memory, random access memory (RAM) programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other computer-readable storage medium capable of storing instructions that cause the one or more processors to perform the techniques described in this disclosure. Memory 38 stores information such as keys used to perform the authentication techniques described in this disclosure, as well as the authentication status of one or more of ONTs 28. For example, memory 38 may store in a lookup table or any other data structure, an authentication status for each one of the ONTs 28 that is coupled to aggregation device 12.

Aggregation device 12 authenticates and forwards video and voice information in substantially the same manner as described above with respect to a data packet. The techniques described in this disclosure are the same for all ONTs 28, whether all ONTs 28 are of the same or different manufacturers, models, or types. ONT 28A is used throughout this disclosure as an example for convenience, clarity and brevity of the disclosure.

Figure 4:
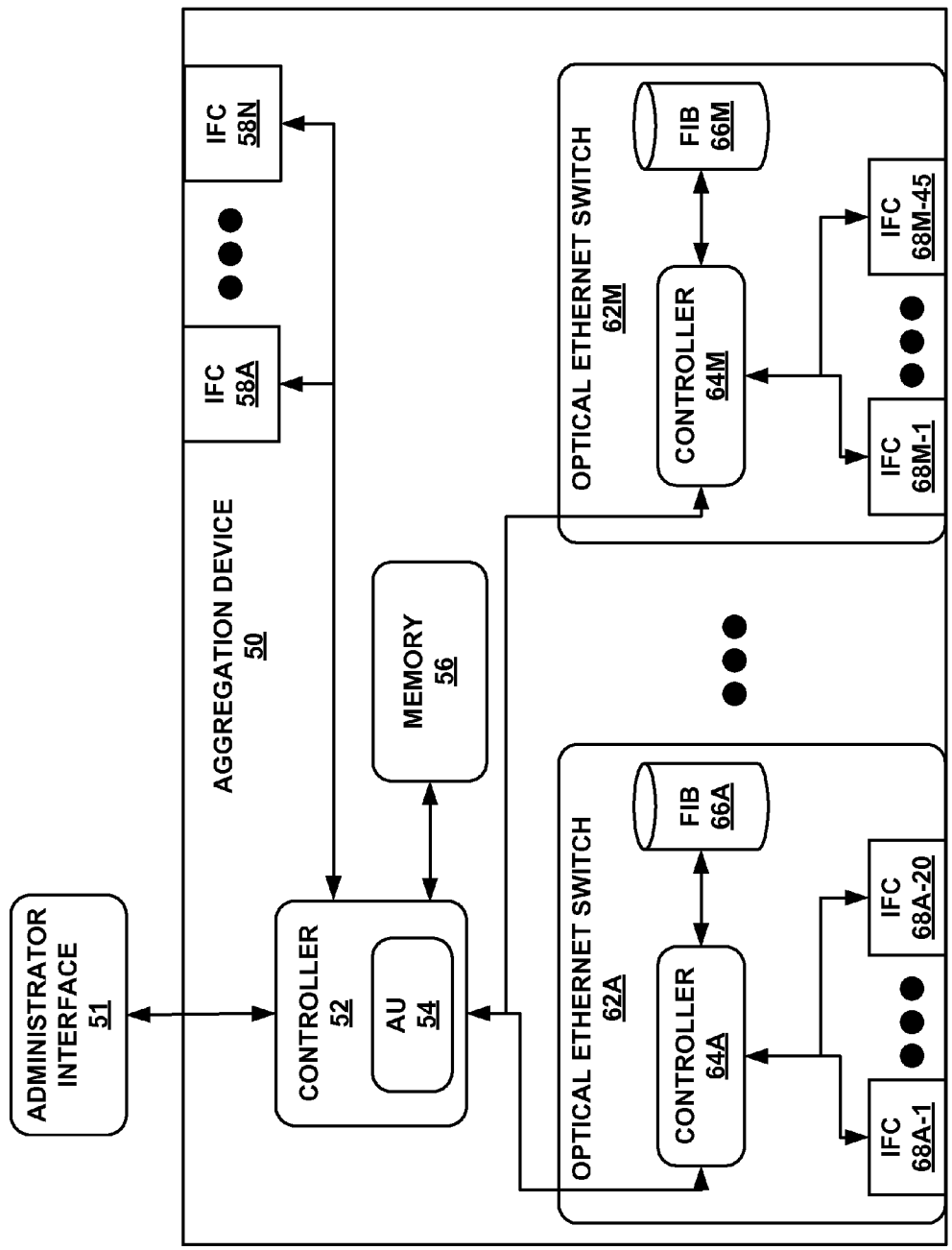
FIG. 4 is a block diagram illustrating another example aggregation device that may implement the techniques described in this disclosure.

FIG. 4 is a block diagram illustrating another example aggregation device that may implement the techniques described in this disclosure. Aggregation device 50 may be comprised of a plurality of optical Ethernet switches, as shown in FIG. 4. In this example, aggregation device 50 includes administrator interface 51, controller 52, AU 54, memory 56, IFCs 58A-58N ("IFCs 58"), optical Ethernet switches 62A-62M ("optical Ethernet switches 62"). IFCs 58 connect to various provider network elements, such as switch facility 16, router 20, and video headend 24 of FIG. 1. IFCs 58 may be capable of connecting to optical fiber, copper, or other types of network links.

Each one of optical Ethernet switches 62 includes a respective one of controllers 64A-64M ("controllers 64"), a respective one of FIBs 66A-66M ("FIBs 66"), and a one or more IFCs 68. Each optical Ethernet switch may have a different number of IFCs 68. For example, optical Ethernet switch 62A may have twenty IFCs 68A, e.g, IFCs 68A-1 through 68A-20, while optical Ethernet switch 62M may have forty-five IFCs 68M, e.g., IFCs 68M-1 through 68M-45. The authorization techniques described in this disclosure operate in the same manner, regardless of the number of IFCs 68 any one particular optical Ethernet switch 62 may have. IFCs 68 connect to subscriber premises devices, such as ONTs 28. In one example, subscriber premises devices are connected to optical Ethernet switch 62A via optical fiber links. In other examples, IFCs 68 may be connected to subscriber premises devices and provider network devices by other types of network links including copper.

Administrator interface 51 may be a command line or graphical user interface displayed on a display device, such as a computer monitor, that facilitates an operator maintaining aggregation device 50. For example, an operator may use administrator interface 51 to store, in memory 56, new keys that correspond to newly deployed ONTs 28 manufactured by a different company, or having a different model number, or of a different type. As another example, if a key is discovered by malicious users, ONTs 28 may receive a firmware update with a new key and an operator would then update the key stored in memory 56 of aggregation device 50 to match the new key programmed into ONTs 28. If a particular manufacturer, model, or type of ONTs 28 is replaced and no longer deployed or if a key is discovered by malicious users, as described above, an operator may use administration interface 51 to remove the old key or keys from memory 56.

Controller 52 manages the flow of information from optical Ethernet switches 62 to IFCs 58, accepts and implements configuration changes, e.g., changes to authorization options, or other changes received via administrator interface 50, manages information storage and retrieval from memory 56, and communicates with AU 54 to facilitate the authentication techniques described in this disclosure. In one example, AU 54 is integral with controller 52. In another example, AU 54 is coupled to controller 52 and may have a memory that is separate from memory 56. AU 54 generates authentication messages, verifies authentication responses received from ONTs 28, and generates authorization complete messages.

For example, assume that optical Ethernet switch 62A is coupled to ONT 28A via IFC 68A-1. When information, such as a data packet, is received via IFC 68A-1 of optical Ethernet switch 62A from ONT 28A, controller 64A examines the data packet, retrieves forwarding information from FIB 66A, and provides controller 52, for example, with information identifying that the data packet was received on IFC 68A-1 of optical Ethernet switch 62A, a serial number or some other unique identifier corresponding to ONT 28A, and forwarding information associated with the data packet. Controller 52 retrieves authentication information associated with ONT 28A and IFC 68A-1 of optical Ethernet switch 62A from memory 56. AU 54 examines the authentication information retrieved from memory 56. If AU 54 determines that ONT 28A is authenticated, or that IFC 68A-1 of optical Ethernet switch 62A does not require authentication, controller 52 processes the data packet according to the forwarding information for the data packet. If AU 54 determines that ONT 28A is not authenticated, controller 52 will not forward the data packet to any other network device, thereby blocking network access to ONT 28A.

When AU 54 determines that ONT 28A is not authenticated and aggregation device 13 does not forward the data packet, aggregation device 50 is operating in port-blocked mode with respect to ONT 28A. When operating in port-blocked mode, aggregation device 50 only processes data packets associated with the protocol used to perform the authentication techniques described in this disclosure and further limits the rate the authentication protocol data packets are processed by aggregation device 50 to prevent a denial of service attack using the authentication protocol itself.

Memory 56 may be a computer-readable storage medium comprising data indicating different keys and instructions that cause one or more processors, e.g., controller 52, to perform various functions. Examples of memory 56 include flash memory, random access memory (RAM) programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other computer-readable storage medium capable of storing instructions that cause the one or more processors to perform the techniques described in this disclosure. Memory 56 stores information such as keys used during the authentication techniques described in this disclosure as well as the authentication status of one or more of ONTs 28. For example, memory 56 may store in a lookup table or any other data structure, an authentication status for each one of the ONTs 28 that is coupled to aggregation device 50.

Aggregation device 50 authenticates and forwards video and voice information in substantially the same manner as described with respect to a data packet. The techniques described in this disclosure are the same for all ONTs 28, whether all ONTs 28 are of the same or different manufacturers, models, or types. ONT 28A is used as an example for convenience and clarity of the disclosure.

The techniques described in this disclosure are not limited to optical Ethernet networks. Rather, the techniques described in this disclosure function in a similar manner on copper-based or other types of Ethernet networks. As such, optical Ethernet switches 62 may instead be standard Ethernet switches that connect to copper or other types of network links.

Figure 5:
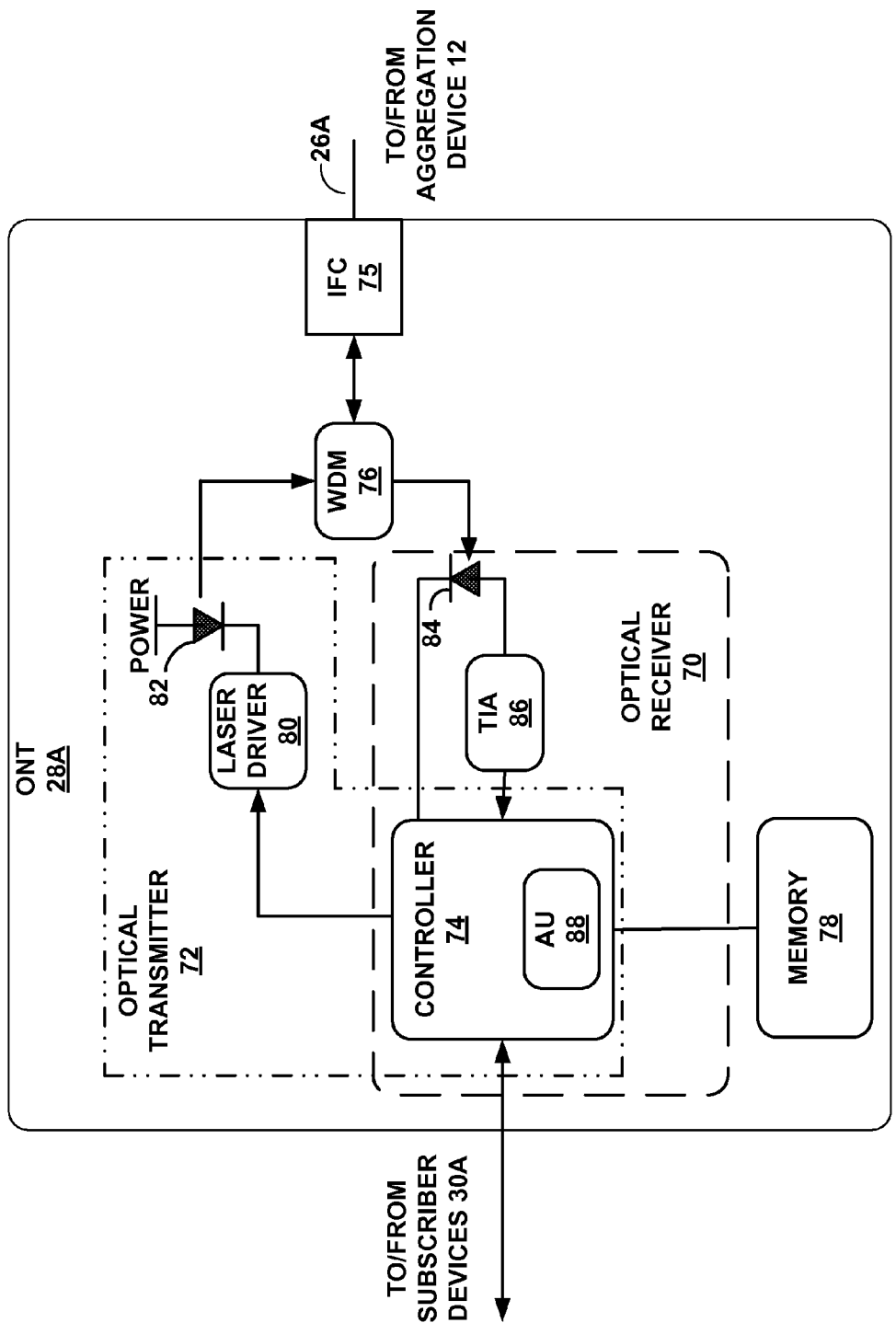
FIG. 5 is a block diagram illustrating an example optical network terminal device that may implement the techniques described in this disclosure.

FIG. 5 is a block diagram illustrating an example ONT that may implement the techniques described in this disclosure. ONT 28A includes optical receiver 70, optical transmitter 72, controller 74, interface ("IFC") 75, wavelength division multiplexer ("WDM") 76, and memory 78. ONTs 28B-28N may include substantially similar components to that of ONT 28A as shown in FIG. 5. As shown in FIG. 5, optical receiver 70 and optical transmitter 72 may share a common controller, namely controller 74. In some examples, rather than sharing a common controller, optical receiver 70 and optical transmitter 72 may each comprise individual controllers.

For upstream transmission of information, such as voice and data service information, controller 74 receives data from one or more client devices, e.g., Internet data terminals such as cable modems and DSL modems, telephones within the subscriber premises, set top boxes, or computers. Client devices may also be referred to as customer premises equipment ("CPE"). ONT 28A may be coupled to client devices via one or more wired or wireless connections. Controller 74 packages the information and provides the information to laser driver 80. Laser driver 80 performs data link layer (i.e., layer 2) functions, including converting the information to an electrical current that drives laser 82 to generate an optical signal. Optical transmitter 72 transmits the optical signal to aggregation device 12 (or aggregation device 50) via WDM 76, IFC 75, and optical fiber link 26A.

For downstream reception of voice, video, and data information, WDM 76 receives an optical signal from aggregation device 12 via WDM 76, IFC 75 and optical fiber link 26A. WDM 76 provides the optical signal to optical receiver 70. Photodiode 84 converts the optical signal to an electrical current and provides the electrical current to transimpedance amplifier ("TIA") 86. One example of photodiode 84 is an avalanche photodiode ("APD"). TIA 86 converts the electrical current to an electrical voltage signal and provides the electrical voltage signal to controller 74. Controller 74 may reassemble electrical voltage signals into data units, such as packets, and provide the data units to one or more devices, e.g., telephones, Internet data terminals, and television set-top boxes, within the subscriber premises.

Memory 78 may be a computer-readable storage medium comprising data indicating different keys and instructions that cause one or more processors, e.g., controller 86, to perform various functions. Examples of memory 79 include flash memory, random access memory (RAM) programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other computer-readable storage medium capable of storing instructions that cause the one or more processors to perform the techniques described in this disclosure.

IFC 75 may comprise ports of one or more interface cards (not shown in FIG. 5). In one example, IFC 75 couples ONT 28A to an aggregation device 12 via fiber link 26A. In another example, IFC 75 may be connected to aggregation device 12 by other types of network links, including copper. In other examples, IFC 75 may be connected to subscriber premises devices and provider network devices by other types of network links, including copper. IFC 75 is coupled to only one network link. For example, IFC 75 is coupled to only a single network link, namely fiber link 26A.

Controller 74 manages the flow of information between client devices 30 and aggregation device 12, manages information storage and retrieval from memory 78, and communicates with AU 88 to facilitate the authentication techniques described in this disclosure. In one example, AU 88 is integral with controller 74. In another example, AU 88 is coupled to controller 74 and may have a memory that is separate from memory 78. AU 88 generates and processes authentication messages during an authentication exchange with aggregation device 12.

For example, ONT 28A may receive a first authentication message from aggregation device 12. The authentication message is communicated to controller 74, which identifies the first authentication message as an authentication request. Controller 74 retrieves information such as model number, serial number, type, and a unique identifier for ONT 28A from memory 78. Controller 78 transmits the authentication request and the information retrieved from memory 78 to AU 88. In response to receiving the authentication request, AU 88 generates a second authentication message, or authentication response, based on the authentication request and the information retrieved from memory 76, and transmits the generated authentication response to controller 74 which then transmits the authentication response to aggregation device 12.

In addition to aggregation device 12 operating in port-blocked mode prior to authenticating ONT 28A, ONT 28A may also operate in port-blocked mode. Prior to receiving an authentication complete message from aggregation device 12, controller 74 prevents information from being transmitted from client devices 30 to aggregation device 12 by blocking all ONT ports (not shown) that may be used to transmit information between aggregation device 12 and client devices 30. This may be referred to as operating in port-blocked mode. After ONT 28A receives a third authentication message, or authentication complete message, from aggregation device 12, ONT 28A unblocks its ports, thereby permitting information to be transmitted between client devices 30 and aggregation device 12. Although the techniques were described above with respect to ONT 28A, the techniques described in this disclosure are substantially similar for ONTs 28B-28N, whether ONTs 28B-28N are of the same or different manufacturers, models, or types. ONT 28A is used as an example for convenience, clarity and brevity of the disclosure.

Figure 6:
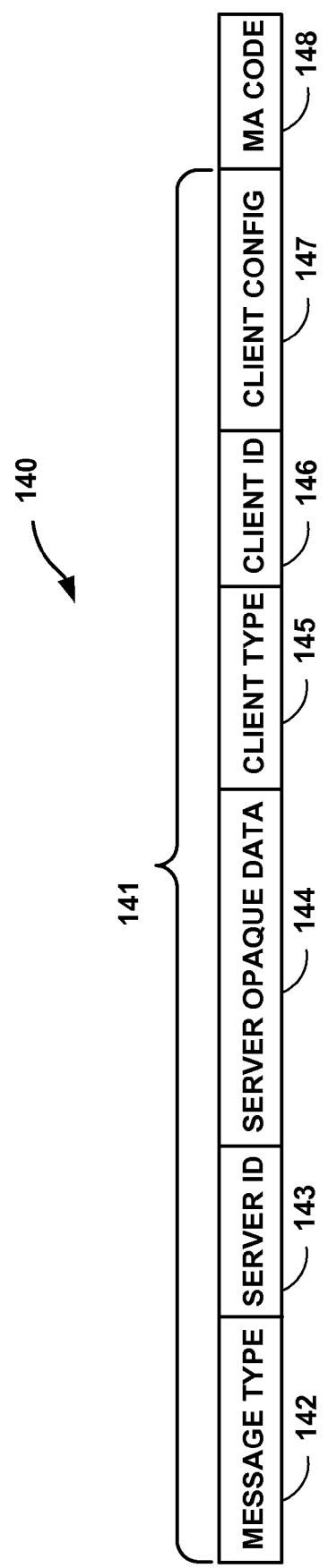
FIG. 6 is an example authentication message format that may be used to implement the techniques of this disclosure.

FIG. 6 is an example authentication message format that may be used to implement the techniques of this disclosure. Authentication message 140 may include two parts, message data 141 and message authentication code ("MA code") 148. In one example, message data 141 may be in clear text format and not encrypted. In some examples, message data 141 may comprise six fields: message type 142, server identifier ("ID") 143, server opaque data 144, client type 145, client ID 146 and client configuration ("config") 147. Message type 142 specifies whether the authentication message is an authentication request, an authentication response, or an authentication complete message. Server ID 143 uniquely identifies the particular aggregation device 12 that is challenging ONT 28A. To help prevent a particular type of network attack referred to as a "replay attack," message data 141 includes server opaque data 144. Server opaque data 144 may, for example, be populated with a value that continues to increase. The value which populates server opaque data 144 may be stored in a counter stored within memory 38 of aggregation device 12 and maintained by controller 34. The counter may be increased incrementally, by a random number automatically generated by controller 34, or the like. Server opaque data 144 may prevent replay attacks by preventing a malicious user from reusing an authentication message 140 from an earlier authentication attempt. Client type 145 may be set to a value that represents an unknown ONT model number, such as all zeros, or the model number for ONT 28A, for example. Similar to client type 145, client ID 146 may also be set to a value that represents an unknown ONT serial number, which may or may not be the same value used for client type 145 to represent an unknown ONT model number, or the serial number corresponding to ONT 28A. Client config 147 contains information that may be useful to ONT 28A when communicating with the network. Client config 147 may include parameters such as management virtual local area network (VLAN) information to enable ONT 28A to effectively configure itself before it is authenticated. Client config 147 may permit ONT 28A to communicate with network management tools used by an operator.

In one example, MA code 148 may contain a value that is calculated using a key and the contents of message data 141. In another example, MA code 148 may contain a value that is calculated using a key, a message digest algorithm, such as Message-Digest algorithm 5 (MD5) or a Secure Hash Algorithm (SHA) including SHA-0 or SHA-1, and the contents of message data 141. In both examples, the key used in calculating MA code 148, in the case of an authentication request message, may be stored in memory 38 of aggregation device 12, or, in the case of an authentication response message, is stored in memory 78 of ONT 28A. Each particular manufacturer, model or type of ONTs 28 may apply a different message digest algorithm or a different type of algorithm to the contents of message data 141 to generate MA code 148. Initially, all ONTs 28 of the same manufacturer, model, or type may be configured such that memory 78 of ONTs 28 stores the same key. ONTs 28 may be configured to generate and store a new key based upon the contents of client ID 146.

Figure 7:
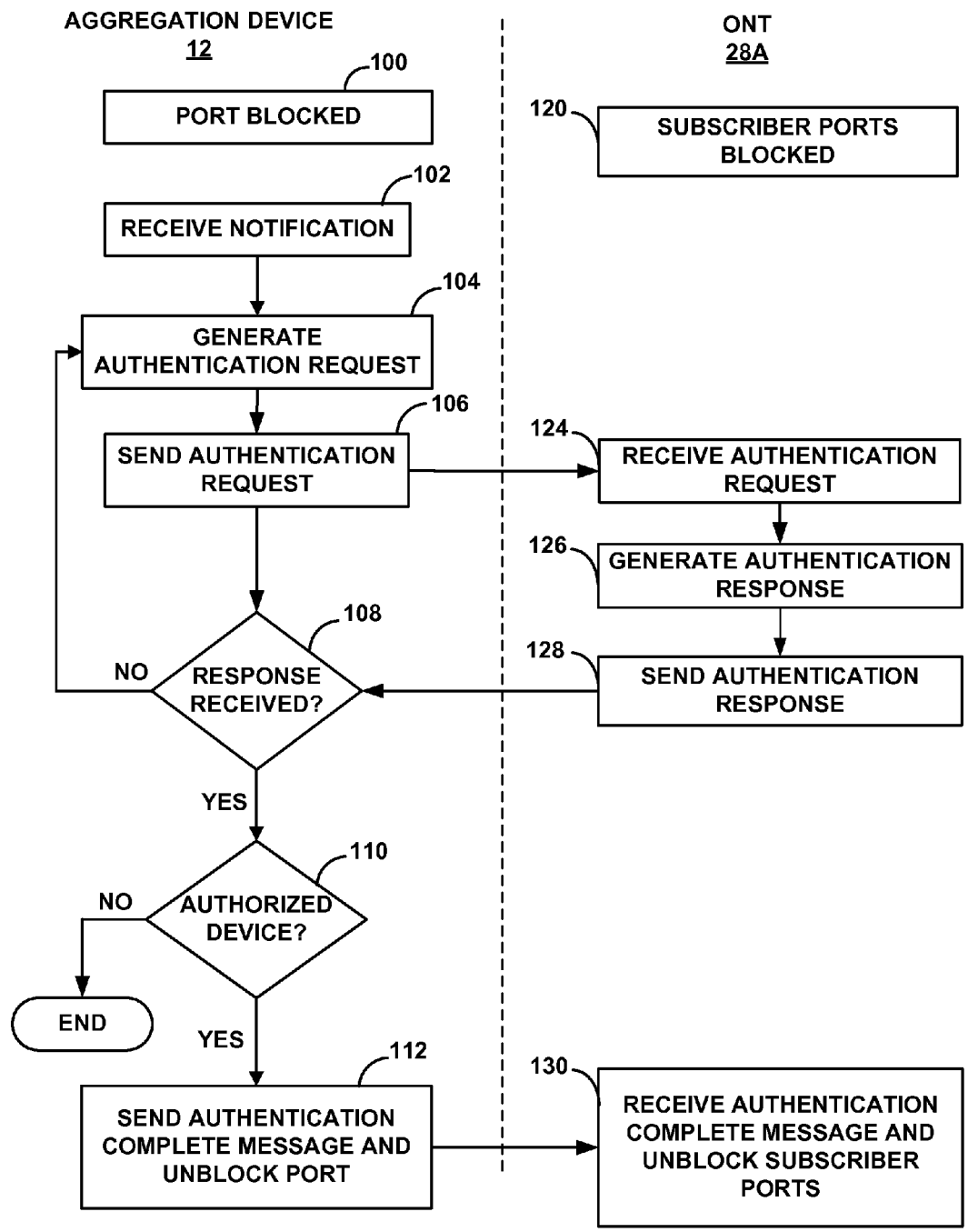
FIG. 7 is a flow chart illustrating an example method for performing authentication between a first optical network device and a second optical network device using the techniques of this disclosure.

FIG. 7 is a flow chart illustrating an example method for performing authentication between a first optical network device, e.g., an aggregation device, and a second optical network device, e.g., an ONT, using the techniques of this disclosure. In FIG. 7, the authentication technique begins with aggregation device 12. Initially, if IFC 42A has its authorization option set to "authorize," aggregation device 12 does not permit information from being transmitted from ONT 28A to any devices on provider network. That is, aggregation device 12 blocks one or more ports (100) associated with ONT 28A and therefore, while ONT 28A is unauthenticated, operates in port-blocked mode with respect to ONT 28A. When IFCs 42 operate in port-blocked mode, IFCs 42 blocks any network traffic, other than information packets that are part of the protocol used to perform the authentication process, from being forwarded to the provider network. Controller 34 also controls the rate of the information packets in order to prevent a denial of service attack using the protocol itself. Aggregation device 12 is capable of operating in port-blocked mode with respect to any one or more IFCs 42 connected to unauthenticated ONTs 28 or any combination of IFCs 42 connected to unauthenticated ONTs 28, while simultaneously operating in unblocked port mode with respect to any one or more IFCs 42 connected to authenticated ONTs 28. Similarly, ONT 28A may operate in port-blocked mode (120), blocking information from being transmitted between client devices 30 and aggregation device 12, while ONT 28A is unauthenticated.

Aggregation device 12 receives notification (102) indicating that ONT 28A needs to be authenticated. In one example, as shown in FIG. 3, controller 34 of aggregation device 12 receives the notification from administrator interface 32. In another example, ONT 28A is connected to aggregation device 12 via fiber link 26A. In such a configuration, aggregation device 12 receives notification from ONT 28A that ONT 28A needs to be authenticated via fiber link 26A. In response to receiving the notification (102), aggregation device 12 generates a first authentication message, or an authentication request (104) comprising a first authentication code. One example format of the authentication request message and the authentication response message is shown in FIG. 6, as described above. In some examples, an authentication request message and an authentication response message may include similar fields and therefore are both represented by authentication message 140, as shown in FIG. 6. In other examples, a single message format may be used for both the authentication request message and authentication response message.

When aggregation device 12 generates an authentication request message, AU 36 sets message type 142 to a value, such as a particular string or number, representing that the message is an authentication request message. AU 36 also sets server ID 143 to the unique identification value corresponding to the particular aggregation device 12 that is generating the authentication request message. Next, AU 36 retrieves the value of a counter stored in memory 38, increments the value by some amount, updates the stored value for the counter, and sets server opaque data 144 to the new value. To facilitate easier administration of aggregation device 12, client type 145 and client ID 146 are presumed to be unknown to aggregation device 12 at the time aggregation device 12 generates the authentication request message. When client type 145 and client ID 146 are unknown, AU 36 may set client type 145 and client ID 146 to a value representing unknown client type and client ID, respectively. This disclosure contemplates that aggregation device 12 may receive information corresponding to client type 145 and client ID 146 of ONT 28A from administration interface 32. Aggregation device 12 may also store model number information for previously authenticated ONTs 28 in memory 38, and AU 36 may retrieve previously stored ONT model numbers and set client type 145 to the model number of ONT 28A.

Next, AU 36 sets client config 147 parameters, such as management VLAN information, that enable ONT 28A to effectively configure itself before it is authenticated. Client config 147 permits ONT 28A to receive configuration information before it is authenticated and is able to acquire an Internet Protocol (IP) address to communicate with network management tools used by an operator. Once all of the parts of message data 141 are set by AU 36, AU 36 generates a first authentication code, e.g., MA code 148, by applying the key retrieved by controller 32 from memory 38 to message data 141. In one example, the key stored in memory 38 is the first key applied by the first optical network device, e.g., aggregation device 12, to generate the first authentication code, e.g., MA code 148. The techniques for generating an authentication request message as described may be performed in any order, e.g., in a particular sequence or in parallel, with the exception that MA code 148 must be generated after all the parts of message data 141 are set.

Once aggregation device 12 generates the authentication request message comprising the first authentication code, aggregation device 12 sends the authentication request message (106) to ONT 28A via IFC 42A, which is coupled to ONT 28A via fiber link 26A. ONT 28A receives the authentication request message (124) and generates an authentication response message (126), comprising a second authentication code, with controller 74. Controller 74 processes client config 147, configures ONT 28A according to the information contained in client config 147, retrieves a key stored in memory 78, and passes the key to AU 88. Next, AU 88 sets message type 142 to a string or number corresponding to an authentication response message, sets client type 145 to the model number of ONT 28A, and sets client ID 146 to the client's unique identifier, such as serial number, media access control (MAC) address, or a programmable identifier.

Once all of the fields of message data 141 are set by AU 88, AU 88 generates a second authentication code, e.g., MA code 148, by applying the key retrieved by controller 74 from memory 78 to message data 141. In one example, the first key, i.e. the key used by aggregation device 12 to generate the first authentication code, is the same as the second key used by ONT 28A to generate the second authentication code.

Alternatively, AU 88 may generate a new key by applying the key retrieved by controller 74 from memory 78 to the value of client ID 146. AU 88 may then apply the newly generated key to message data 141 to generate a new value which AU 88 then stores in MA code 148. AU 88 may generate a new key in response to any authentication request message received from aggregation device 12. For example, the second key used by ONT 28A to generate the second authentication code is the newly generated key and is not the same as the first key used by aggregation device 12 to generate the first authentication code. AU 88 may be programmed to generate the new key upon receiving an initial authentication request message, after receiving a set number of authentication request messages, or in response to some other event, including a firmware update or upon an operator request. ONT 28A then transmits the authentication response message (128) comprising the second authentication code to aggregation device 12.

After aggregation device 12 transmits the authentication request message (106), aggregation device waits to receive a response from ONT 28A. If an authentication response message is not received by aggregation device 12 within a predetermined time, for example, (NO in block 108), aggregation device 12 may generate a new authentication request message (104) and send the new authentication request message to ONT 28A (106). Aggregation device 12 may be configured to continue generating new authentication request messages (104) and transmitting the new authentication request messages to ONT 28A (106) at a configurable rate, using a configurable timer, for example, until an authentication response message is received (YES in block 108). Aggregation device 12 may also be configured to stop generating and transmitting new authentication request messages (104) to ONT 28A (106) after a set number of authentication request messages have been sent to ONT 28A, or after a certain amount of time has elapsed.

Once aggregation device 12 receives an authentication response from ONT 28A (YES in block 108), aggregation device 12 determines whether ONT 28A is a valid network device. In particular, controller 34 processes the authentication response and sends the message data 141 and MA code 148 to AU 36. AU 36 extracts client type 145 from message data 141 and retrieves the key corresponding to the model number, for example, contained in client type 145 from memory 38. AU 36 then applies the key to message data 141 to generate a third authentication code, or new MA code, and compares the MA code AU 36 generated to MA code 148 of the authentication response. In one example, the key stored in memory 38 and used to generate the third authentication code is the first key applied by aggregation device 12, i.e., the first optical network device. If the MA code, i.e., the third authentication code, generated by aggregation device 12 matches MA code 148 generated by ONT 28A, then ONT 28A is a valid network device (YES in block 110).

If the newly generated MA code does not match MA code 148, ONT 28A may still be a valid network device. For example, each client may generate a different key for itself using its client ID and a shared key. Using different keys may make it more difficult for a malicious user to mimic the protocol even if the user knew the shared key. In one example, if the newly generated MA code does not match MA code 148, AU 36 may generate a new MA code based on a new key and compare the new MA code based on the new key to MA code 148. In this example, AU 36 may generate a new key by applying the old key, e.g., the shared key, retrieved from memory 38 to the information contained in client ID 146. AU 36 may then apply the new key to message data 141 to generate another MA code. If the MA code based on the new key, e.g. a third authentication code based on a third key, matches MA code 148, ONT 28A is a valid network device (YES in block 110). If the newest MA code does not match MA code 148 (NO in block 110), ONT 28A is not an authorized network device and the authentication process terminates.

In another example, aggregation device 12 may be configured such that AU 36 examines client type 145 upon receiving an authentication response message from ONT 28A. Based on client type 145, AU 36 may determine that ONT 28A is configured to generate a new key, e.g. a second key, that is different from the shared key, upon receiving an authentication request message and use the second key when generating MA code 148. ONT 28A generates the new key using the techniques describe above. AU 36 of aggregation device 12 may then generate a new key, e.g. a third key, by applying the first key, i.e. the shared key, to client ID 146 of the authentication response. Aggregation device 12 may generate a new MA code by applying the third key to message data 141 to generate a third authentication code. The third key may be the same as the second key used by ONT 28A to generate the second authentication code. If the MA code based on the new key, e.g. a third authentication code based on a third key, matches MA code 148, ONT 28A is a valid network device (YES in block 110). If the newest MA code does not match MA code 148 (NO in block 110), ONT 28A is not an authorized network device and the authentication process terminates.

If AU 36 determines that ONT 28A is a valid network device, AU 36 generates an authentication complete message, sends the authentication complete message to ONT 28A, and unblocks the ports associated with ONT 28A (112). Controller 34 may also store information about ONT 28A in memory 38, such as the new key, if one was generated in the authentication process, client ID 144 and client type 145 and propagate the information to other aggregation devices or network management tools. ONT 28A receives the authentication complete message and unblocks the ports connected to client devices 30 (130). Once aggregation device 12 and ONT 28A complete the authentication technique described, client devices 30 are free to transmit and receive information to the provider network.

The messaging between aggregation device 12 and ONT 28A can be realized by creating a new protocol or by extending existing protocols. A new EtherType or a well-known MAC address can be utilized to easily distinguish the protocol packets. There are existing link local protocols, such as Ethernet Operations, Administration and Maintenance (Ethernet OAM) or Link Layer Discover Protocol (LLDP), which may be extended to include authentication exchanges.

To prevent an attack using a standard Ethernet bridge between aggregation device 12 and ONT 28A, for example, the protocol used for device authentication may include a layer two header that prevents a standard bridge from forwarding the authentication message packet. The IEEE 802.1d specification defines sixteen such MAC addresses that, when used as a layer two header for authentication message packets, prevent a standard Ethernet bridge from forwarding the packets. This ensures that the protocol only operates when aggregation device 12 is directly connected to ONT 28A.

Periodically, aggregation device 12 or ONT 28A may initiate an authentication process even though ONT 28A was already authenticated. Such periodic authentication may ensure that ONT 28A remains the network device previously authorized to couple to aggregation device 12, thereby preventing a user from replacing ONT 28A with an unauthorized network device after authentication of ONT 28A is complete. The additional authentication processes may occur at a predefined interval or immediately after the connection between aggregation device 12 and ONT 28A is lost, for example.

Figure 8:
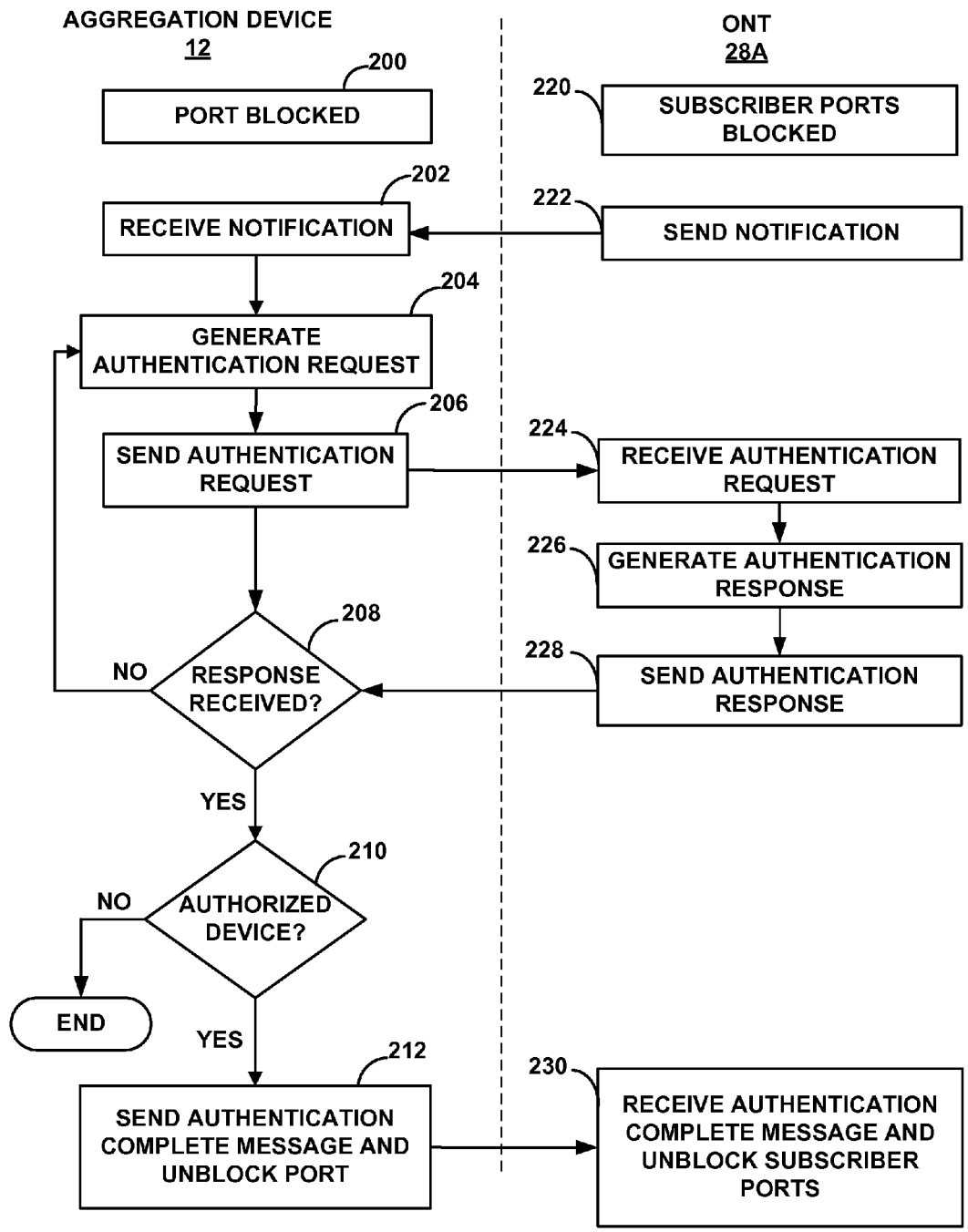
FIG. 8 is a flow chart illustrating another example method for performing authentication between a first optical network device and a second optical network device using the techniques of this disclosure.

FIG. 8 is a flowchart illustrating another example method for performing authentication between a first optical network device and a second optical network device using the techniques of this disclosure. Unlike the method illustrated in FIG. 7, the method illustrated in FIG. 8 initiates the authentication process when ONT 28A sends aggregation device 12 notification that ONT 28A is ready to be authenticated (222).

In one example, ONT 28A does not have the required configuration parameters that permit ONT 28A to communicate directly with aggregation device 12 until after ONT 28A has received an authentication request message. Therefore, ONT 28A sends a broadcast message through its port coupled to aggregation device 12. Aggregation device 12 receives the notification message (202) and then proceeds through the authentication technique as described with respect to FIG. 7. Steps 200-212 and 224-230 of FIG. 8 correspond to steps 100-112 and 124-130 of FIG. 7 and will not be described again.

In another example, an operator programs the necessary configuration parameters into ONT 28A. The operator may program ONT 28A prior to or after installation at the customer premises. Once programmed, ONT 28A may send aggregation device 12 a notification that ONT 28A is ready to begin the authorization process (222) and the authorization process will continue as described above with respect to FIG. 7.

Aggregation device 12 and ONT 28A are used merely as examples. Aggregation device 50 and ONTs 28B-28N may perform these techniques in substantially the same manner. One having ordinary skill in the art would understand this disclosure as teaching how to implement the authentication techniques described in this disclosure using aggregation device 50 and ONTs 28B-28N.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, SDRAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the invention have been described. These and other examples are within the scope of the following claims.

The invention claimed is:
1. A method comprising:
generating, via a first optical network device comprising one or more ports, a first authentication message comprising first message data and a first authentication code computed based on the first message data and a first key, without accessing a database storing unique credentials for subscribers;
transmitting, via the first optical network device, the first authentication message to a second optical network device;
receiving, via the first optical network device, a second authentication message comprising second message data and a second authentication code generated via the second optical network device based on the second message data and a second key;
generating, via the first optical network device, a third key based on the first key and a second client identification field of the second message data;
generating, via the first optical network device, a third authentication code by applying the third key and a message digest algorithm to the second message data;
authorizing, via the first optical network device, communication between the first optical network device and the second optical network device, at least in part by comparing the second authentication code with the third authentication code; and
when the second authentication code matches the third authentication code, transmitting, via the first optical network device, a third authentication message to the second optical network device, and unblocking at least one of the one or more ports.

2. The method of claim 1,
wherein computing the first authentication code comprises applying the first key and the message digest algorithm to the first message data, and
wherein computing the second authentication code comprises applying the second key and the message digest algorithm to the second message data.

3. The method of claim 1, wherein generating the first authentication message comprises:
generating the first authentication code by applying the first key and the message digest algorithm to the first message data; and
applying a layer two header comprising a reserved media access control address to the first authentication message.

4. The method of claim 1, wherein the first key is the same as the second key.

5. The method of claim 1, wherein the first message data comprises a message type field, a server identification field, a server opaque data field, a first client type field, and a client configuration field, and
wherein the second message data comprises the message type field, the server identification field, the server opaque data field, a second client type field, and the client configuration field.

6. The method of claim 1, further comprising receiving, from an administration interface of the first optical network device, configuration information comprising a key corresponding to at least one of a model, a type, and a manufacturer of the second optical network device.

7. The method of claim 1, wherein the first optical network device is an optical network aggregation device, and wherein the second optical network device is an optical network termination device.

8. The method of claim 1, wherein the message digest algorithm is based on at least one of a model, a type, and a manufacturer of the second optical network device.

9. An optical network device comprising one or more ports and a processor configured to:
generate a first authentication message comprising first message data and a first authentication code computed based on the first message data and a first key, without accessing a database storing unique credentials for subscribers;
transmit the first authentication message to a second optical network device;
receive a second authentication message comprising second message data and a second authentication code generated via the second optical network device based on the second message data and a second key;
generate a third key based on the first key and a second client identification field of the second message data;
generating a third authentication code by applying the third key and a message digest algorithm to the second message data;
authorize communication between the optical network device and the second optical network device, at least in part by comparing the second authentication code with the third authentication code; and
when the second authentication code matches the third authentication code, transmit a third authentication message to the second optical network device, and unblock at least one of the one or more ports.

10. The optical network device of claim 9, wherein the processor is further configured to:

compute the first authentication code by applying the first key and the message digest algorithm to the first message data; and
receive the second authentication code, wherein the second authentication code is generated via the second optical network device by applying the second key and the message digest algorithm to the second message data.

11. The optical network device of claim 9, wherein the processor is further configured to:
generate the first authentication message by applying the first key and the message digest algorithm to the first message data; and
apply a layer two header comprising a reserved media access control address to the first authentication message.

12. The optical network device of claim 9, wherein the first key is the same as the second key.

13. The optical network device of claim 9,
wherein the first message data comprises a message type field, a server identification field, a server opaque data field, a first client type field, and a client configuration field, and
wherein the second message data comprises the message type field, the server identification field, the server opaque data field, a second client type field, and the client configuration field.

14. The optical network device of claim 9, wherein the processor is further configured to receive, from an administration interface of the optical network device, configuration information comprising a key corresponding to at least one of a model, a type, and a manufacturer of the second optical network device.

15. The optical network device of claim 9, wherein the optical network device is an optical network aggregation device, and wherein the second optical network device is an optical network termination device.

16. The optical network device of claim 9, wherein the message digest algorithm is based on at least one of a model, a type, and a manufacturer of the second optical network device.

17. A non-transitory computer-readable storage medium comprising instructions that, upon execution, cause one or more processors of a first optical network device comprising one or more ports to:
generate, a first authentication message comprising first message data and a first authentication code computed based on the first message data and a first key, without accessing a database storing unique credentials for subscribers;
transmit the first authentication message to a second optical network device;
receive a second authentication message comprising second message data and a second authentication code generated via the second optical network device based on the second message data and a second key;
generate a third key based on the first key and a second client identification field of the second message data;
generate a third authentication code by applying the third key and a message digest algorithm to the second message data; and
authorize, via the first optical network device, communication between the first optical network device and the second optical network device, at least in part by comparing the second authentication code with the third authentication code; and
when the second authentication code matches the third authentication code, transmit a third authentication message to the second optical network device, and unblock at least one of the one or more ports.

18. The non-transitory computer-readable storage medium of claim 17,
wherein the instructions that, upon execution, cause the one or more processors to compute the first authentication code further comprise instructions that cause the one or more processor to apply the first key and the message digest algorithm to the first message data, and
wherein the second authentication code generated via the second optical network device is generated by applying the second key and the message digest algorithm to the second message data.

19. The non-transitory computer-readable storage medium of claim 17, wherein the instructions that, upon execution, cause the one or more processors to generate the first authentication message further comprise instructions that cause the one or more processors to:
generate the first authentication code by applying the first key and the message digest algorithm to the first message data; and
apply a layer two header comprising a reserved media access control address to the first authentication message.

20. The non-transitory computer-readable storage medium of claim 17, wherein the first key is the same as the second key.

21. The non-transitory computer-readable storage medium of claim 17,
wherein the first message data comprises a message type field, a server identification field, a server opaque data field, a first client type field, and a client configuration field, and
wherein the second message data comprises the message type field, the server identification field, the server opaque data field, a second client type field, and the client configuration field.

22. The non-transitory computer-readable storage medium of claim 17, further comprising instructions that, upon execution, cause the one or more processors to receive, from an administration interface of the first optical network device, configuration information comprising a key corresponding to at least one of a model, a type, and a manufacturer of the second optical network device.

23. The non-transitory computer-readable storage medium of claim 17, wherein the first optical network device is an optical network aggregation device, and wherein the second optical network device is an optical network termination device.

24. The non-transitory computer-readable storage medium of claim 17, wherein the message digest algorithm is based on at least one of a model, a type, and a manufacturer of the second optical network device.

25. An optical network device comprising:
one or more ports;
means for generating a first authentication message comprising first message data and a first authentication code computed based on the first message data and a first key, without accessing a database storing unique credentials for subscribers;
means for transmitting the first authentication message to a second optical network device;
means for receiving a second authentication message comprising second message data and a second authentication code generated via the second optical network device based on the second message data and a second key;
means for generating a third key based on the first key and a second client identification field of the second message data;
means for generating a third authentication code by applying the third key and a message digest algorithm to the second message data;
means for authorizing communication between the optical network device and the second optical network device, at least in part by comparing the second authentication code with the third authentication code; and
means for, when the second authentication code matches the third authentication code, transmitting a third authentication message to the second optical network device, and unblocking at least one of the one or more ports.

26. The optical network device of claim 25,
wherein the means for computing the first authentication code comprises means for applying the first key and the message digest algorithm to the first message data, and
wherein the second authentication code generated via the second optical network device is generated by applying the second key and the message digest algorithm to the second message data.

27. The optical network device of claim 25, wherein the means for generating the first authentication message comprises:
means for generating the first authentication code by applying the first key and the message digest algorithm to the first message data; and
means for applying a layer two header comprising a reserved media access control address to the first authentication message.

28. The optical network device of claim 25, wherein the first key is the same as the second key.

29. The optical network device of claim 25, wherein the first message data comprises a message type field, a server identification field, a server opaque data field, a first client type field, and a client configuration field, and
wherein the second message data comprises the message type field, the server identification field, the server opaque data field, a second client type field, and the client configuration field.

30. The optical network device of claim 25, further comprising means for receiving, from an administration interface of the optical network device, configuration information comprising a key corresponding to at least one of a model, a type, and a manufacturer of the second optical network device.

31. The optical network device of claim 25, wherein the optical network device is an optical network aggregation device, and wherein the second optical network device is an optical network termination device.

32. The optical network device of claim 25, wherein the message digest algorithm is based on at least one of a model, a type, and a manufacturer of the second optical network device.

33. A system comprising:
an optical network termination device; and
an optical network aggregation device, wherein the optical network aggregation device comprises one or more ports and one or more processors configured to:
generate a first authentication message comprising first message data and a first authentication code computed based on the first message data and a first key, without accessing a database storing unique credentials for subscribers;

transmit the first authentication message to the optical network termination device;
receive a second authentication message comprising second message data and a second authentication code generated via the second optical network device based on the second message data and a second key;
generate a third key based on the first key and a second client identification field of the second message data;
generate a third authentication code by applying the third key and a message digest algorithm to the second message data;
authorize communication between the optical network aggregation device and the optical network termination device, at least in part by comparing the second authentication code with the third authentication code; and
when the second authentication code matches the third authentication code, transmit a third authentication message to the second optical network device, and unblock at least one of the one or more ports.

* * * * *